United States Patent [19]

Metter

[11] 4,384,245

[45] May 17, 1983

[54] ALTERNATOR VOLTAGE REGULATOR

[75] Inventor: Ronald G. Metter, Chicago, Ill.

[73] Assignee: TRW Inc., Cleveland, Ohio

[21] Appl. No.: 177,705

[22] Filed: Aug. 12, 1980

[51] Int. Cl.³ .......................... H02J 7/14; H02P 9/04
[52] U.S. Cl. ...................................... 322/28; 320/64; 322/29; 322/73
[58] Field of Search ............... 320/61, 64, 68; 322/28, 322/59, 60, 72, 73, 99, 29, 32

[56] References Cited

U.S. PATENT DOCUMENTS

| | | | |
|---|---|---|---|
| 3,121,836 | 2/1964 | Rosenberry | 322/73 X |
| 3,546,532 | 12/1970 | Eisenstadt | 322/28 X |
| 3,602,797 | 8/1971 | Bleher | 322/28 |
| 3,663,946 | 5/1972 | Iwaki | 322/28 X |
| 3,775,666 | 11/1973 | Smith | 322/28 |
| 3,858,103 | 12/1974 | Hill | 320/64 |
| 3,858,108 | 12/1974 | Bray | 322/28 |
| 3,895,283 | 7/1975 | Peterson | 320/35 |
| 3,904,948 | 9/1975 | Earle | 320/64 X |
| 3,984,755 | 10/1976 | Lehnhoff et al. | 322/28 |
| 4,019,120 | 4/1977 | Fattic | 322/28 |
| 4,041,369 | 8/1977 | King et al. | 320/64 X |
| 4,059,771 | 11/1977 | Jacobs et al. | 320/64 X |
| 4,112,475 | 9/1978 | Stitt et al. | 322/28 |
| 4,136,311 | 1/1979 | Scheidler | 322/28 |
| 4,169,992 | 10/1979 | Nash | 322/29 |
| 4,258,307 | 3/1981 | Mori et al. | 322/28 |

Primary Examiner—R. J. Hickey
Attorney, Agent, or Firm—Fay & Sharpe

[57] ABSTRACT

This application discloses a voltage regulator for use in conjunction with alternators to increase the life of the power transistor which is used for switching the field current to the alternator field windings. The regulator determines the relative speed between the alternator rotor and stator by means of an operational amplifier having one input connected through a voltage divider to an isolated speed dependent output, e.g. the Y connection of the stator, and the other input connected through a voltage divider with the alternator output and the battery to be charged. When the rotational speed exceeds a predetermined value, the operational amplifier produces a high output which functions as a reference voltage. A second operational amplifier has one input connected with the first operational amplifier to receive the reference voltage and a second input connected through a voltage divider to the alternator output. When the fraction of the output voltage determined by the voltage divider fails to exceed the reference voltage, the second operational amplifier produces a high output which enables the power transistor to switch the field current into the alternator field windings. A feedback loop between the output and the first input of the second operational amplifier reduces the reference voltage when the power transistor is in its conductive state.

21 Claims, 1 Drawing Figure

ALTERNATOR VOLTAGE REGULATOR

BACKGROUND OF THE INVENTION

This application relates to the art of power regulation and, more particularly, to the regulation of the output voltage from alternators. The invention is particularly applicable to voltage regulators for use in conjunction with alternators and will be described with particular reference thereto. It will be appreciated, however, that the invention has broader applications and may be used in conjunction with other power generating apparatus and in other power regulation applications.

Alternators commonly have three stator windings which are connected to a Y or delta configuration. A voltage is induced in the stator winding by rotation of the magnetic field generated in a rotor. The rotor has a small amount of residual magnetism which is sufficient to generate a small voltage in the stator windings. Further, field windings are provided to increase the magnetic field when a field current flows through the field windings. The increased magnetic field increases the voltage output from the stator windings. Other alternator designs have used a power transistor to control the flow of the field current to the field windings. A shunt transistor has been used to switch the power transistor between its conductive and nonconductive states as the output voltage of the stator windings rises above or falls below a predetermined output voltage.

One of the principal problems with prior art voltage regulators has been in the relatively high failure rate of the power transistors. More specifically in this regard, it has been found that when the power transistor was supposed to be in its fully conductive state, the shunt transistor was actually still conducting some current. Such conduction removed some of the base current from the power transistor to cause an increased voltage drop thereacross. This voltage drop, in turn, caused the power transistor to generate additional heat and eventually to fail.

The present invention contemplates a new and improved alternator voltage regulator which overcomes the above referenced problems as well as others and provides such a regulator which is reliable, long-lived, simple to build, and economical.

SUMMARY OF THE INVENTION

In accordance with the present invention, there is provided on alternator regulator arrangement which limits the states of the power transistor to only its fully conductive state and its nonconductive state.

More particularly in accordance with the invention, there is provided a voltage regulator circuit for use in conjunction with an alternator having a rotor which is rotatable relative to a stator for generating a voltage output. A field winding increases the voltage output when the field current flows therethrough. The regulator circuit comprises a speed sensing means for producing a reference signal in response to rotor rotation relative to the stator exceeding some predetermined speed. Operatively connected with this speed sensing means is a first comparator which produces an enable signal in response to the output voltage of the alternator reaching some predetermined relationship with the reference signal. Operatively connected with the first comparator is means for switching the field current to the field winding of the alternator in response to the enable signal.

The principal advantage of the present invention is the provision of an effective arrangement which limits the conductive states of the power transistor to its fully conductive and its nonconductive states.

Another advantage of the invention resides in the fact that it only supplies no current or a predetermined current to the base of the power transistor.

Yet another advantage of the invention is that it uses an operational amplifier for controlling the power transistor which acts as a current source in its high state and a current sink in its low state.

Still other advantages of the invention will become apparent to those skilled in the art upon a reading and understanding of the following specification.

BRIEF DESCRIPTION OF THE FIGURE

The invention may take physical form in certain parts and arrangements of parts, a preferred embodiment of which will be described in detail in the specification and illustrated in the accompanying drawing which forms a part hereof and wherein THE FIGURE shows a circuit schematic of an alternator voltage regulator formed in accordance with the present invention.

DESCRIPTION OF THE PREFERRED EMBODIMENT

Figure 1:
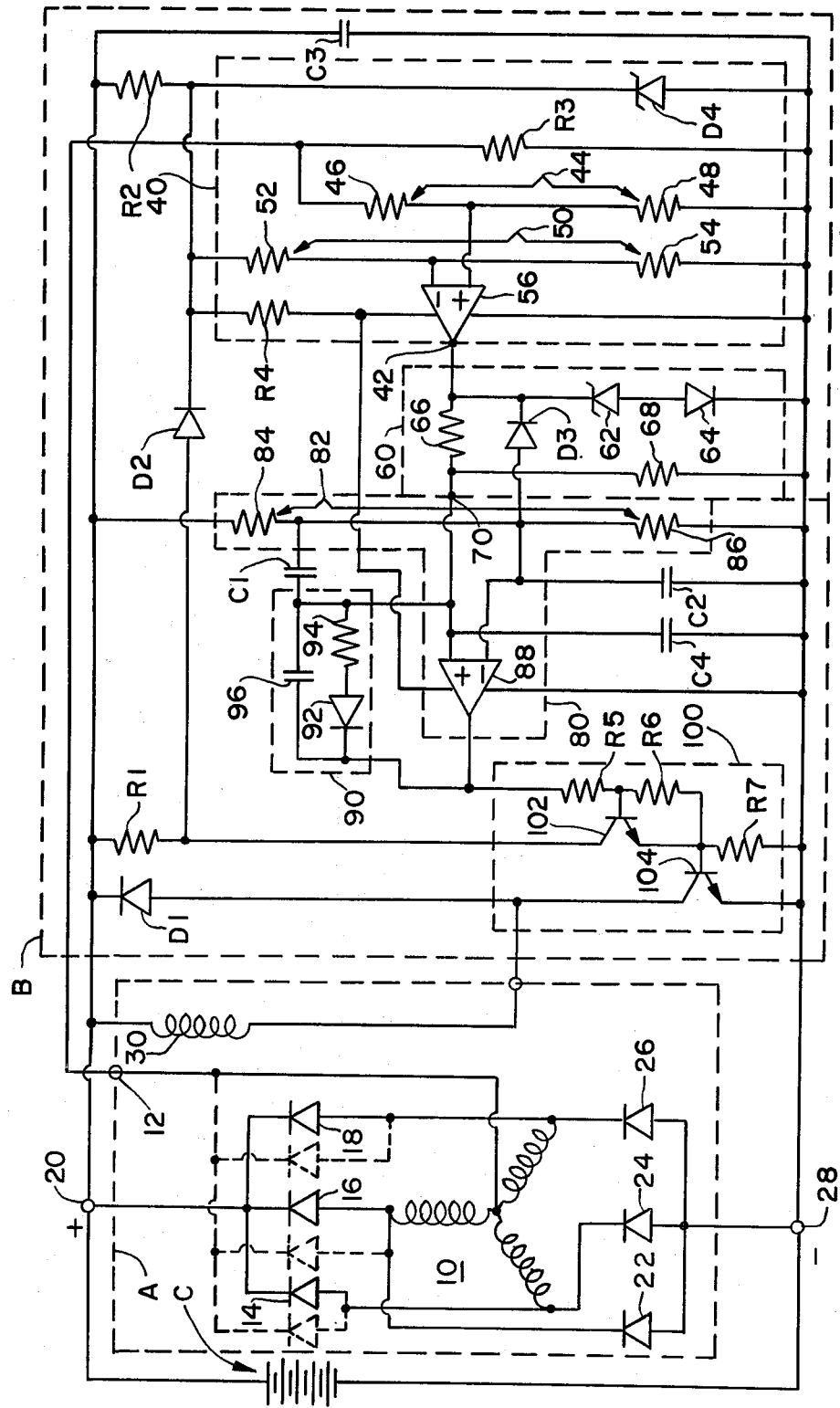

Referring now to the drawing wherein the showing is for purposes of illustrating the preferred embodiment of the invention only and not for purposes of limiting same, the FIGURE illustrates a conventional three-phase alternator A in conjunction with a voltage regulator B for generating a regulated output voltage. The alternator A is shown coupled in parallel with a battery C for recharging same. The voltage regulator B regulates the voltage output of the alternator A to maintain the amplitude of the output voltage in conformity with the voltage rating of the battery C. A common application of the alternator A and voltage regulator B is for recharging twelve volt automative batteries.

The alternator A is comprised of three stator windings or coils 10 which are illustrated arranged in a conventional Y configuration. However, it should be appreciated that the alternator may have its stator coils 10 arranged in a conventional delta configuration if so desired. An isolated speed dependent output 12 carries a potential which varies when the alternator is not in a regulating mode with the relative rotational speed of the rotor and stator. The isolated speed dependent output of the alternator with the coils in a Y configuration is the common connection of the three Y coils which is commonly designated the neutral or Y output. A first plurality of diodes 14, 16, and 18 are connected between the other end of the three stator coils and a positive side of the alternator output 20. A second plurality of diodes 22, 24, and 26 are connected between the three stator coils and a negative side 28 or ground of the alternator output. The alternator further has a field coil 30 which is connectable between the positive and negative sides of the alternator output. As will be discussed below, the regulator includes a switching means for controlling the connection of the field coil 30 with both the positive and negative side of the output of the alternator.

Alternately, the isolated speed dependent output 12 may be connected to the stator coils by three diodes in parallel with the first or second plurality of diodes. At lower speeds at which the potential is below the regulated potential, the potential varies with the rotational speed of the rotor relative to the stator. Because the output of the alternator is connected in parallel with the battery C, the potential across the positive output 20 and ground does not drop below the potential supplied the battery. This use of diodes is applicable to both delta and Y configured stator coils. Other speed dependent outputs are also contemplated such as using a separate speed sensing coil, a diode to isolate the potential between positive output 20 and the first plurality of diodes, and the like.

The voltage regulator B includes a speed sensing means 40 for producing a reference signal on its output 42 in response to the rotation of the rotor relative to the stator exceeding some predetermined speed. The speed sensing means comprises a first voltage divider 44 comprised of a first resistor 46 and a second resistor 48. The first voltage divider reduces the potential from the alternator's speed dependent output 12 by some fraction which is determined by the relative sizes of resistors 46 and 48. A second voltage divider 50 comprising resistors 52 and 54 reduces the potential at the alternator output 20 by some fraction which is determined by the relative sizes of resistors 52 and 54. At low speeds, the potential at the alternator output is the voltage produced by battery C. Biasing resistors R1, R2, and R3 have little affect on the fractions determined by voltage dividers 44 and 50. When the alternator rotor first begins to rotate, the field coil has no current flowing through it. The potential across the alternator output 20 and ground is essentially the greater of the battery C voltage and the alternator output potential. At low speeds, the battery voltage is the greater. In the preferred embodiment, the resistors of the second voltage 50 divider are selected to provide an output of about one tenth of a volt.

The residual magnetism of the rotor generates a positive voltage at the isolated speed dependent output 12 of the stator coils 10. The amplitude of the voltage at the speed dependent output 12 is a function of the speed at which the rotor is rotating relative to the stator. A typical voltage for a Y configuration of the stator coils is on the order of zero to one volt. The relative magnitudes of the resistors of the first voltage divider are selected such that the output of the first voltage divider 44 exceeds the output of the second voltage divider 50 when the speed of the rotor reaches some predetermined speed, typically a few hundred rpm.

A comparing means 56 is provided for comparing the outputs of the first and second voltage dividers to produce a reference signal on output 42 when some predetermined relationship is reached between the voltage on the alternator output 20 and the voltage on the speed dependent output 12. Because the amplitude of the output of the first voltage divider 44 is a function of the speed of the rotor relative to the stator, the reference signal is produced in response to the rotor rotation exceeding some predetermined speed. In the preferred embodiment, the comparing means 56 comprises an operational amplifier which has a low output when the output of the second voltage divider 50 exceeds the output of the first voltage divider 44 and a high output when the output of the first voltage divider 44 exceeds the output of the second voltage divider 50. The high output produced by the operational amplifier 56 at output 42 comprises a reference voltage in the preferred embodiment.

A reference signal amplitude controlling means 60 controls the amplitude of the reference voltage produced by operational amplifier 56. The reference signal controlling means comprises a zener diode 62 disposed in series with a regular diode 64. The preferred zener diode has a 5.6 volt junction voltage which prohibits the signal on output 42 from exceeding 6.3 volts. A voltage divider comprised of resistors 66 and 68 reduces the 6.3 volt signal by a predetermined fraction. In this manner, the reference signal at the output 70 of the reference signal amplitude controlling means 60 has a closely controlled amplitude.

A comparator means 80 produces an enable signal in response to the alternator output reaching some predetermined relationship with the reference signal. The comparator means 80 has a voltage divider 82 comprising a resistor 84 and a resistor 86. The voltage divider 82 reduces the alternator output voltage by some predetermined fraction. A first input of an operational amplifier 88 is connected with output 70 of the reference signal amplitude controlling means 60 and a second input of the operational amplifier 88 is connected with the voltage divider 82. The operational amplifier 88 produces a high output or enable signal and thus acts as a current source when the amplitude of the reference signal received at the first input exceeds the amplitude of the signal received at the second input.

The relative magnitudes of resistors 66, 68, 84, and 86 are selected such that the output of the voltage divider 82 matches the reference signal from output 70 when the alternator output reaches some predetermined voltage. For example, if battery C is a twelve volt battery, a common predetermined voltage for shutting off the field coil of the alternator is approximately fourteen volts. Thus, these resistors are selected such that when fourteen volts is applied across resistors 84 and 86, the output of the voltage divider 82 meets reference voltage from the output 70. When the output of the voltage divider 82 received on the second input of the operational amplifier 88 exceeds the reference signal received on its first input, its output is low, i.e., the operational amplifier 88 functions as a current sink.

A reference signal altering means 90 alters the amplitude of the reference signal from 70 in response to the high output or enable signal from the operational amplifier 88. The reference signal altering means 90 comprises a feedback loop which lowers the reference signal by about one half to one volt when the enable signal of the operational amplifier 88 is produced. This shift in the magnitude of the reference signal alters the predetermined output voltage which the alternator must reach to shut off the enable signal, i.e., switch operational amplifier 88 to its low state. This inhibits the operational amplifier 88 from oscillating rapidly between its high and low states when the alternator output is very close to the predetermined output voltage. Effectively, this causes about one half volt difference between the alternator output at which operational amplifier 88 goes to its high state and the alternator output at which it returns to its low state. The feedback loop comprises a diode 92 in series with the resistor 94 and in parallel with a capacitor 96.

The enable signal from the comparator means 80 controls a switching means 100 for switching the field current to the field winding 30 in response to the enable signal. The switching means includes a cascading transistor 102 whose base is connected with the comparator means 80 to receive the enable signal. Applying the enable signal to the base of cascading transistor 102 switches the transistor from its nonconductive to its fully conductive state. When the cascading transistor 102 is switched to its conductive state, it biases the base of a power or switching transistor 104 from its nonconductive to its fully conductive state. The power transistor 104 in its conductive state permits the field current to flow through the field coil 30 of the alternator A. When the enable signal is discontinued, cascading transistor 102 switches to its nonconductive state which, in turn, switches power transistor 104 to its nonconductive state. In this manner, power transistor 104 is limited to two states, i.e., its fully conductive state or its nonconductive state. Because the operational amplifier 88 acts as either a current source or a current sink, cascading transistor 102 and power transistor 104 can not assume partially conductive states.

In addition to the above discussed circuit components, other circuit components are provided to accommodate conventional biasing and filtering functions. A detailed discussion of these components is deemed unnecessary for one of ordinary skill in the art to make and use the invention. In TABLE I set forth below such other circuit components have been assigned reference characters. For completeness of the disclosure, TABLE I is used to identify exemplary components employed for a 12 volt alternator voltage regulator.

TABLE I

Exemplary Circuit Components

| Class of Component | Reference Numeral | Value or Identification |
|---|---|---|
| operational amplifier | 56 and 88 | RCA CA358G |
| resistors | 46 | 2.2k ohms |
|  | 48 | 1.0k |
|  | 52 | 120k |
|  | 54 | 1k |
|  | 66 | 3k |
|  | 68 | 2.2k |
|  | 84 | 120k |
|  | 86 | 22k |
|  | 94 | 200k |
|  | R1 | 48 |
|  | R2 | 100 |
|  | R3 | 100 |
|  | R4 | 240 |
|  | R5 | 560 |
|  | R6 | 1k |
|  | R7 | 220 |
| capacitors | 96 | .033 microfarads |
|  | C1 | .05 |
|  | C2 | .01 |
|  | C3 | 0.5 |
|  | C4 | .033 |
| diodes | 64 | IN 4001 |
|  | 92 | IN 4001 |
|  | D1 | IN 5401 |
|  | D2 | IN 4001 |
|  | D3 | IN 4001 |
| zener diodes | 62 | 5.6 junction voltage |
|  | D4 | 15 |
| transistors | 102 | GES5818 |
|  | 104 | 2N6488 |

The invention has been described with reference to the preferred embodiment. Obviously, modifications and alterations will occur to others upon a reading and understanding of the specification. It is intended to include all such modifications and alterations insofar as they come within the scope of the appended claims or the equivalents thereof.

Having thus described the invention, it is now claimed:

1. A voltage regulator circuit for an alternator having a rotor which rotates relative to a stator for generating an alternator voltage output and a field winding for increasing the alternator voltage output when a field current flows therethrough, said voltage regulator circuit comprising:
   speed sensing means for producing a reference signal in response to the rotation of the rotor relative to the stator exceeding a predetermined speed;
   first comparator means for producing an enable signal in response to the alternator output voltage reaching a predetermined relationship with said reference signal, said first comparator means being operatively connected with said speed sensing means and with said alternator;
   signal altering means for altering the amplitude of said reference signal in response to said enable signal, said signal altering means being operatively connected to said first comparator means; and,
   switching means for switching the field current to said field winding in response to said enable signal, said switching means being operatively connected with said first comparator means.

2. The regulator circuit as set forth in claim 1 further including reference signal amplitude control means for controlling the amplitude of said reference signal, said reference signal controlling means being operatively connected with said speed sensing means.

3. The regulator circuit as set forth in claim 2 wherein said reference signal amplitude control means comprises a zener diode in parallel with a voltage divider.

4. A voltage regulator circuit for an alternator having a rotor which rotates relative to a stator for generating an alternator voltage output and a field winding for increasing the alternator voltage output when a field current flows therethrough, said voltage regulator circuit comprising:
   a speed sensing means including an operational amplifier having a first input operatively connected with an isolated speed dependent output of said alternator and having a second input operatively connected with the alternator voltage output, said operational amplifier producing a high output when the magnitude of the signal received on its first input exceeds the amplitude of the signal received on its second input and a low output when the magnitude received on its second input exceeds the magnitude of the signal received on its first input, said high output comprising a reference signal;
   first comparator means for producing an enable signal in response to the alternator output voltage reaching a predetermined relationship with said reference signal, said first comparator means being operatively connected with said speed sensing means and with said alternator; and,
   switching means for switching the field current to said field winding in response to said enable signal, said switching means being operatively connected with said first comparator means.

5. The regulator circuit as set forth in claim 4 wherein said speed sensing means further includes a first voltage divider operatively connected with said operational amplifier first input and a second voltage divider operatively connected with said operational amplifier second input.

6. The regulator circuit as set forth in claim 5 wherein said comparator means comprises an operational amplifier having a first input operatively connected with said speed sensing means and a second input operatively connected with the alternator voltage output, said operational amplifier having a high output signal when the amplitude of the signal received on the first input exceeds the amplitude of the signal received on the second input and producing a low output signal when the amplitude of the signal received on the second input exceeds the amplitude of the signal received on the first input, said high output signal comprising said enable signal.

7. The regulator circuit as set forth in claim 6 further including a voltage divider operatively connecting said second input with said alternator voltage output.

8. A voltage regulator circuit for an alternator having a rotor which rotates relative to a stator for generating an alternator voltage output and a field winding for increasing the alternator voltage output when a field current flows therethrough, said voltage regulator circuit comprising;
  speed sensing means for producing a reference signal in response to the rotation of the rotor relative to the stator exceeding a predetermined speed;
  an operational amplifier having a first input operatively connected with said speed sensing means, a second input operatively connected with the alternator voltage output and an output, said operational amplifier assuming a high state when the amplitude of the signal received on the first input exceeds the amplitude of the signal received on the second input and assuming low state when the amplitude of the signal received on the second input exceeds the amplitude of the signal received on the first input, in said high state an enable signal is produced on the operational amplifier output;
  a feedback loop connected between the operational amplifier output and the operational amplifier first input for reducing the amplitude of the reference signal received on the first input in response to said enable signal; and,
  switching means for switching the field current to said field winding in response to said enable signal, said switching means being operatively connected with said operational amplifier output.

9. The regulator circuit as set forth in claim 8 wherein the feedback loop comprises a capacitor connected in parallel with a series diode and resistor.

10. The regulator circuit as set forth in claim 8 wherein said switching means comprises a cascading transistor having its base connected with said operational amplifier such that the cascading transistor is placed in its conductive state by said enable signal, said switching means further comprising a power transistor in series with said field winding, the base of said power transistor being connected with said cascading transistor such that the power transistor is caused to be in its fully conductive state when the cascading transistor is in its conductive state.

11. The regulator circuit as set forth in claim 2 wherein said switching means comprises a power transistor connected in series with the field winding of said alternator, the base of said power transistor being operatively connected with said comparator means such that the enable signal places the power transistor in its conductive state.

12. A voltage regulator circuit for a three phase alternator having a rotor which rotates relative to a plurality of stator coils for generating a potential across an alternator output, having at least one field winding which increases said potential when a field current flows therethrough, being adapted for charging a rechargable battery connected across the alternator output, and having a speed dependent output which carries a potential that varies substantially with the speed of the rotation of the rotor relative to the stator, said voltage regulator circuit comprising:
  a first operational amplifier having a first input operatively connected with the speed dependent output and having a second input operatively connected with the alternator output, said first operational amplifier producing a high output signal when a predetermined relationship exists between the amplitude of the signals received on its first and second inputs;
  a second operational amplifier having a first input operatively connected with the output of said first operational amplifier and having a second input operatively connected with the alternator output, said second operational amplifier producing a high output signal in response to a predetermined relationship between the amplitude of the signals received on its first and second inputs; and,
  a power transistor connected in series with the alternator field winding, the base of the power transistor being operatively connected with the output of said second operational amplifier such that the high output signal of the second operational amplifier renders said power transistor fully conductive.

13. The regulator circuit as set forth in claim 12 wherein the stator coils of the alternator are arranged in a Y configuration and wherein the speed dependent output is operatively connected with the common connection of the stator coils.

14. The regulator circuit as set forth in claim 12 further including a reference signal control means for controlling the amplitude of the high output signal from said first operational amplifier, said control means being operatively connected with the output of the first operational amplifier to produce a reference voltage in response to the high output signal from the first operational amplifier, said first input of the second operational amplifier being operatively connected with said control means.

15. The regulator circuit as set forth in claim 14 further including a feedback loop operatively connected between the output of said second operational amplifier and the first input of said second operational amplifier, said feedback loop reducing the magnitude of the reference voltage received on the first input of the second operational amplifier in response to the high output signal of the second operational amplifier.

16. The regulator circuit as set forth in claim 15 further including a cascading transistor having its base operatively connected with said second operational amplifier to be rendered conductive by said high output signal from the second operational amplifier, said cascading transistor being operatively connected with the base of said power transistor such that the cascading transistor renders the power transistor fully conductive when the cascading transistor is in its conductive state.

17. A battery recharging circuit comprising:
  an alternator having three stator windings connected in a Y configuration, a speed dependent output operatively connected with a common connection of the three stator coils, an alternator output operatively connected with the stator coils, and a field winding for increasing the potential at the alternator output when a field current flows therethrough;

a battery which is operatively connected with said alternator output; and a voltage regulator circuit having (i) a first comparator means for producing a reference signal when some predetermined relationship exists between the amplitude of signals received on its first and second 18. The regulator circuit as set forth in claim 8 wherein in said low state said operational amplifier functions as a current sink.

19. A voltage regulator circuit for an alternator which includes a rotor that rotates relative to a stator for generating an alternator output voltage on an alternator voltage output and a field winding for increasing the alternator output voltage when a field current flows therethrough, said voltage regulator circuit comprising:

speed sensing means for producing a fixed amplitude DC reference signal in response to the rotation of the rotor relative to the stator exceeding a predetermined angular velocity and a low signal below the predetermined angular velocity;

a bistable solid state circuit means selectively assuming a first state in which the bistable circuit means produces a high output signal on a bistable circuit means output such that the bistable circuit means functions as a current source and second state in which the bistable circuit means produces a substantially fixed amplitude low output signal on the bistable circuit output such that the bistable circuit means functions as a current sink, the bistable circuit means includes a first input operatively connected with said speed sensing means and a second input operatively connected with the alternator voltage output, said bistable circuit means assuming the first state in response to the fixed DC reference signal exceeding a fixed function of the alternator output voltage and assuming the second state in response to the fixed function of the alternator output voltage exceeding the signal from the speed sensing means; and, switching means for switching the field current to said field winding in response to said bistable circuit means high signal, said switching means being operatively connected with said bistable circuit means.

20. The regulator circuit as set forth in claim 19 wherein the speed sensing circuit includes an operational amplifier for producing a high signal on its output above the preselected angular velocity and a low signal below the preselected angular velocity and further including a reference signal amplitude controlling means operatively connected with the speed control operational amplifier output for fixing the amplitude of the operational amplifier high signal, the operational amplifier high signal with the fixed amplitude being the fixed amplitude reference signal.

21. The regulator circuit as set forth in claim 20 wherein the bistable circuit means includes an operational amplifier.

* * * * *